United States Patent Office 2,769,783
Patented Nov. 6, 1956

2,769,783

LUBRICATING COMPOSITIONS

William C. Hollyday, Jr., Fanwood, N. J., assignor to Esso Research and Engineering Company, a corporation of Delaware No Drawing. Application October 15, 1952,
Serial No. 314,943

6 Claims. (Cl. 252—45)

This invention relates to new compositions of matter. It also relates to lubricating oil compositions. The invention particularly relates to lubricating oil compositions containing dissolved there minor amounts of lubricating oil pour point depressant and to the oil-soluble pour point depressant material per se. More particularly the invention relates to condensation products of amines, mercaptans and alcohols with polymers of acrolein and methyl vinyl ketone which are oil-soluble and which have the unique characteristic of depressing the pour point of mineral lubricating oils.

In the past when lubricating oil manufacturers wished to prepare a product which would remain in a fluid state at low temperatures it was necessary to stringently refine the crude distillates used in preparing the lubricating oil fraction. A great deal of time and effort was spent in dewaxing the mineral oil fraction to obtain a low cold test oil. The presence of petroleum wax in a lubricating oil results in loss of fluidity at temperatures below the melting point of the wax since at these low temperatures wax crystallizes in long needle-shaped crystals which interlock and thereby entrap the oil and prevent free flowing. However, there has been developed a series of synthetic materials which modify the structure characteristics of wax crystals. When small amounts of these materials are placed in a lubricating oil containing wax, the crystals that form at low temperatures are not of a long needle-like variety previously experienced and the oil remains free to flow at low temperatures. The temperature at which an oil containing wax loses its properties of free flow is called the pour point of the oil. Hence these synthetic materials designed to lower this temperature are called pour point depressants. It is a novel material of this type, that is, one having the property of depressing the pour point of wax-containing oils, with which this instant invention is concerned.

It has been found and forms the object of this invention that the condensation products of a material having the structure

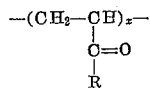

wherein R is hydrogen or a methyl group and wherein $x$ designates the degree of polymerization, with a material selected from the class consisting of primary or secondary amines, mercaptans and alcohols are new and valuable materials. The value of $x$ may range from 3 to 200, and is preferably in the range of 30 to 60.

The structural formula set out above may be advantageously obtained by polymerizing a material having the formula

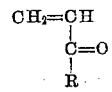

in which compound R may be either hydrogen or a methyl group. It is to be recognized that when R is hydrogen the compound is acrylic aldehyde, commercially known as acrolein. When the R group is a methyl group the compound is methyl vinyl ketone.

The polymerization of the acrolein or the methyl vinyl ketone as disclosed above is accomplished by heating a solution of the monomer in the presence of a peroxide type catalyst. The diluent used for solubilizing the monomers is an inert diluent preferably a hydrocarbon diluent. Such materials as benzene, toluene, xylene, heptane may be used. Also operable are carbontetrachloride and the various chlorobenzenes. The temperature at which the polymerization is carried out may vary from about 15° C. to 125° C. with a range of from 80° C. to 100° C. being preferred. The time needed for the polymerization reaction will vary according to the monomer chosen but may be accomplished within from about 1 to 50 hours, preferably from 1 to 12 hours. As catalyst for the polymerization reaction, ultra-violet light or those of the peroxide type are most suitably employed, preferable are those catalysts exemplified by benzoyl peroxide, acetyl peroxide, and cumene hydroperoxide with the former being especially preferred. The amount of catalyst used may vary from about 0.1% to 5.0% by weight based on the weight of the polymerizable monomer with from 0.5% to 3.0% by weight being contemplated in the preferred embodiment. The catalyst is preferably added to the solution of monomer during the course of the polymerization in small increments. However, if desired, the catalyst may all be added at one time.

As was stated above these polymers are reacted with a primary or secondary amine, mercaptan or alcohol to form the pour point depressants of invention. The amine, mercaptan or alcohol may be present in 50 to 150% of the theoretical amount needed to react with the polymer. The following equations illustrate these reactions:

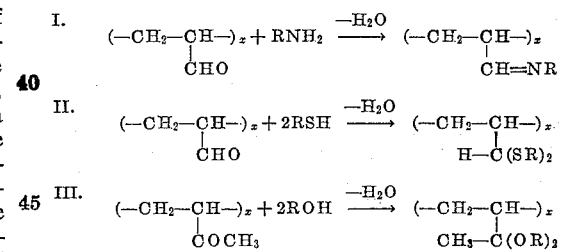

It is to be seen that an active hydrogen atom must be present in order to combine with the oxygen atom of the carboxyl group of the polymer, hence the amines are limited to primary and secondary amines.

The resulting material is a linear polymer having side chains corresponding to the R grouping of the alcohol, amine or mercaptan. Although the materials of this invention contemplate side chains having from 1 to 20 carbon atoms, it has been found that for oil solubility properties the R group should be of sufficient length, that is should contain from 3 to 20 carbon atoms in a straight chain. It is preferred that R contains from 8 to 18 carbon atoms and the preferred embodiment of this invention so contemplates.

It is also within the concept of this invention to react a mixture of various amines or alcohols with the polymeric material. Commercial mixtures of primary aliphatic amines ranging from $C_8$ to $C_{18}$ and having an average molecular weight of about 200 are available and are completely satisfactory for the preparation of the materials of invention. Mixtures of alcohols having from 8 to 20 carbon atoms with an average of about 13.5 carbon atoms per molecule are commercially available under the trade name "Lorol" alcohols. These alcohols are also eminently satisfactory. The amount of the oil soluble condensation product which is incorporated with a lubricating oil to lower the pour point thereof will ordinarily vary from 0.005% to about 10% by weight, percentages being based on the weight of the total composition. A preferred range and one being operable in most base stocks is from 0.01% to 3.0% by weight. It has been found advantageous to prepare condensates of lubricating oil additive materials for ease in handling and general economy. Ordinarily these condensates are prepared by blending from about 10% to about 60% by weight of an additive with a mineral oil base. The lubricating oil manufacturer then blends the desired amount of these concentrates in his base stock to prepare the finished product. The pour point depressant materials of the instant invention adapt themselves very favorably to the preparation of concentrates for such purposes.

The invention will be more clearly explained by reference to the following examples which are given for purposes of illustration only.

*Example I.—Preparation of acrolein polymer*

A solution of one part by weight of distilled (inhibitor-free) acrolein in two parts of benzene was heated to reflux, and over 7 hours 5 equal portions of benzoyl peroxide were added (total catalyst 2.5% based upon acrolein). During this time the polymer which formed precipitated from the benzene. The benzene was evaporated on the steam bath, leaving the polymer as a fine white powder.

*Example II.—Reaction of acrolein polymer with amines*

To 20 g. of acrolein polymer (corresponding to 0.36 mols of acrolein) were added 100 g. (0.50 moles) of Armeen CD. Armeen CD is a mixture of primary aliphatic amines ranging from $C_8$ to $C_{18}$ in carbon chain length and having an average molecular weight of 200. The mixture of acrolein polymer and amines became warm spontaneously. To this mixture were added 200 ml. of benzene and refluxing was continued for 7 hours, during which time almost all the acrolein polymer dissolved. The benzene was distilled from the reaction mixture and the residue was extracted with several volumes of methanol.

Fifty-one grams of unreacted amine were recovered from the methanol extracts, and the yield of viscous, methanol-insoluble oil was 46 g. This product was oil-soluble and believed to have the structure $$(-CH_2CH-)_x$$
$$\qquad |$$
$$\quad CH=NR$$

Theory 5.88% nitrogen, found 5.46% nitrogen.

The product was tested as a pour depressant in a conventionally refined Mid-Continent SAE 20 grade oil with the results shown in Table I.

*Example III.—Reaction of acrolein polymer with mercaptans*

To 9 g. of acrolein polymer (corresponding to 0.16 mols of acrolein) prepared as in Example I suspended in 100 ml. of benzene were added 40 g. (0.18 moles) of Lorol mercaptan. Lorol mercaptan is a mixture of $C_8$ to $C_{18}$ primary mercaptans having an average molecular weight of 220. The mixture was refluxed in the presence of a small amount of sodium hydroxide and water for 20 hours. At the end of this time the benzene was removed by distillation and the residue was extracted with acetone. The acetone-insoluble, oil-soluble product weighed 19 g. and is believed to have essentially the structure

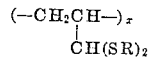

Analysis of the product indicated that most but not quite all the aldehyde groups reacted with mercaptan. Theory 13.38% sulfur, found 12.18% sulfur.

There was also recovered 24 g. of acetone soluble material, a large part of which was unreacted mercaptan, and a completely insoluble residue of 3.5 g. remained. The product was tested as a pour depressant with the results given in Table I.

*Example IV.—Reaction of acrolein polymer with alcohols*

To 20 g. of a viscous, oily acrolein polymer (corresponding to 0.36 mols of acrolein and made by treating the monomer containing a small amount of hydroquinone with benzoyl peroxide) were added 150 g. (0.72 moles) of Lorol alcohol and 300 ml. of benzene. Lorol alcohol is a $C_8$ to $C_{18}$ mixture of primary aliphatic alcohols having an average molecular weight of 208. The mixture was refluxed for 6 hours in the presence of a small amount of hydrochloric acid. At the end of this time the benzene was removed by distillation and the residue was extracted with methanol. There were obtained 108 g. of unreacted Lorol alcohol and 46 g. of methanol-insoluble, oil-soluble product. The product is believed to have the structure $$(-CH_2CH-)_x$$
$$\qquad |$$
$$\quad CH(OR)_2$$

The product was tested as a pour depressant with the results given in Table I.

*Example V.—Polymerization of methyl vinyl ketone*

Methyl vinyl ketone dissolved in 10 volumes of water and heated on the steam bath was treated with four 0.5% portions of benzoyl peroxide over 20 hours. After 50 hours a precipitate had formed. By extracting the combined water layer and precipitate with benzene the product was found to consist of about 40% viscous, oily, benzene-soluble polymer and about 60% rubbery, acetone-soluble polymer. The oily polymer was used in Examples VII and VIII and the rubbery polymer was used in Example VI.

*Examples VI to VIII.—Reaction of methyl vinyl ketone polymer with amines, mercaptans and alcohols*

In experiments similar to Examples II and IV above methyl vinyl ketone polymer was reacted with Armeen CD, Lorol mercaptan and Lorol alcohol. The products were tested as pour depressants, and the results are shown in Table I.

TABLE I

*Pour depressant properties of acrolein and methyl vinyl ketone derivatives*

| Ex. No. | Type of Polymer | Reagent | ASTM Pour Pt., °F. of Oil Blends containing Wt. percent Polymer Indicated (1) | | | |
|---|---|---|---|---|---|---|
| | | | .02 | .05 | .10 | .25 |
| II | Acrolein | Amines | −20 | −20 | −30 | −25 |
| III | ----do---- | Mercaptans | 0 | −5 | −10 | −10 |
| IV | ----do---- | Alcohols | −10 | −10 | −10 | −10 |
| VI | Methyl Vinyl Ketone | Amines | +5 | 0 | 0 | −15 |
| VII | ----do---- | Mercaptans | −10 | −10 | −10 | −10 |
| VIII | ----do---- | Alcohols | −5 | −5 | −5 | −5 |

¹ Test oil: Mid-Continent SAE 20 grade, ASTM pour point without pour depressant + 10° F.

It will be seen from the data of Table I above that the condensation products of this invention depress the pour point of a lubricating oil a total of from 15° F. to 40° F. in concentrations from 0.02% to 0.25% by weight.

Lubricating oil compositions containing the condensation products of this invention may be prepared to contain other additive materials such as other pour point depressants, viscosity index improvers, oxidation inhibitors, detergent inhibitors, sludge dispersants, and the like. Compatibility of the condensation products of this invention with other additive materials has been found to be generally excellent.

To summarize briefly this invention relates to pour point depressant materials, the method of their manufacture and lubricating oil blends containing a minor but pour point depressing amount of such materials. It particularly relates to a new composition of matter comprising a polymer of a material having the formula

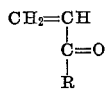

wherein R is a methyl group or a hydrogen atom with a material selected from the group consisting of primary and secondary amines, mercaptans, and alcohols. Specifically preferred for pour depressant action are copolymers of acrolein and/or methyl vinyl ketone condensed with technical mixtures of $C_8$ to $C_{18}$ amines, mercaptans and alcohols.

Although the materials of the invention have outstanding utility as pour point depressing agents, they are also useful as viscosity index improvers, resins, adhesives, coating compositions, plastic modifiers and the like.

What is claimed is:

1. A lubricating oil composition which comprises a mineral lubricating oil containing from 0.005% to 60% by weight based on the total composition, of a condensation product of a polymer prepared by polymerizing a material having the formula:

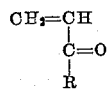

wherein R is selected from the class consisting of hydrogen and methyl groups, at a temperature of from about 15° C. to 125° C. for from about 1 to 50 hours in the presence of from about 0.1% to 5% by weight, based on the weight of the polymerizable material, of a peroxide type catalyst, and reacting the polymer so formed with about 50% to 150% of the theoretical amount needed to react with the polymer, of an aliphatic material selected from the class consisting of primary and secondary amines, mercaptans and alcohols containing from 8 to 18 carbon atoms.

2. A lubricating oil composition according to claim 1 wherein said condensation product is present in a minor but pour point depressing amount.

3. A lubricating oil composition according to claim 1 wherein said condensation product is present in amounts of about 0.005% to 10% by weight, based on the weight of the total composition.

4. A lubricating oil composition which consists essentially of a mineral lubricating oil containing from 0.01% to 3.0% by weight, based on the weight of the total composition, of a condensation product of a polymer prepared by polymerizing a material having the formula:

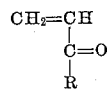

wherein R is selected from the group consisting of hydrogen and methyl groups, at a temperature of from about 15° C. to 125° C. for from about 1 to 50 hours in the presence of about 0.1% to 5% by weight, based on the weight of the polymerizable material, of a peroxide type catalyst and reacting the polymer so formed with about 50% to 150% of the theoretical amount needed to react with the polymer, of an aliphatic mixture of primary alcohols of from 8 to 18 carbon atoms and having an average of 13.5 carbon atoms per molecule.

5. A lubricating oil composition which consists essentially of a mineral lubricating oil containing from 0.01% to 3.0% by weight, based on the weight of the total composition, of a condensation product of a polymer prepared by polymerizing a material having the formula:

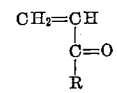

wherein R is selected from the group consisting of hydrogen and methyl groups, at a temperature of from about 15° C. to 125° C. for from 1 to 50 hours in the presence of about 0.1% to 5% by weight, based on the weight of the polymerizable material, of a peroxide type catalyst and reacting the polymer so formed with about 50% to 150% of the theoretical amount needed to react with the polymer, of a mixture of primary aliphatic amines having from 8 to 18 carbon atoms and having a molecular weight of about 200.

6. A lubricating oil composition which consists essentially of a mineral lubricating oil containing from 0.01% to 3.0% by weight, based on the weight of the total composition, of a condensation product of a polymer prepared by polymerizing a material having the formula:

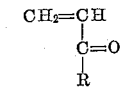

wherein R is selected from the group consisting of hydrogen and methyl groups, at a temperature of from about 15° C. to 125° C. for from about 1 to 50 hours in the presence of about 0.1% to 5.0% by weight based on the weight of the polymerizable material, of a peroxide type catalyst and reacting the polymer so formed with about 50% to 150% of the theoretical amount needed to react with the polymers of a mixture of primary aliphatic mercaptans of from 8 to 18 carbon atoms and having a molecular weight of about 220.

References Cited in the file of this patent

UNITED STATES PATENTS

| 2,122,707 | Balthis | July 5, 1938 |
| 2,565,529 | Smith | Aug. 28, 1951 |
| 2,569,932 | Izard | Oct. 2, 1951 |